United States Patent [19]

Fischer et al.

[11] Patent Number: 4,663,379

[45] Date of Patent: May 5, 1987

[54] PREPARATION OF AQUEOUS DISPERSIONS OF CONDENSATES OF UREA AND CH-ACIDIC ALDEHYDES, AND PRODUCTION OF SURFACE COATING BINDERS

[75] Inventors: Kurt Fischer, Ludwigshafen; Harro Petersen, Frankenthal; Werner Loch, Erpolzheim; Hellmuth Kasch, Ludwigshafen; Eckehardt Wistuba, Bad Durkheim, all of Fed. Rep. of Germany

[73] Assignee: BASF Aktiengesellschaft, Fed. Rep. of Germany

[21] Appl. No.: 704,099

[22] Filed: Feb. 22, 1985

[30] Foreign Application Priority Data

Feb. 23, 1984 [DE] Fed. Rep. of Germany ....... 3406473

[51] Int. Cl.$^4$ .............................................. C08L 61/24
[52] U.S. Cl. .................................. 524/376; 524/512; 524/598
[58] Field of Search ...................... 524/512, 598, 376; 528/259

[56] References Cited

U.S. PATENT DOCUMENTS

| | | | |
|---|---|---|---|
| 3,772,292 | 11/1973 | Martin | 8/127.6 |
| 3,836,495 | 9/1974 | Berstein | 524/512 |
| 4,220,751 | 9/1980 | Petersen et al. | 528/259 |
| 4,243,797 | 1/1981 | Petersen et al. | 528/259 |
| 4,298,512 | 11/1981 | Sartoretto | 528/259 |
| 4,455,416 | 1/1984 | Floyd | 528/245 |

FOREIGN PATENT DOCUMENTS 575004 4/1959 Canada ............................ 524/512

Primary Examiner—C. Warren Ivy
Attorney, Agent, or Firm—Keil & Weinkauf

[57] ABSTRACT

A process for the preparation of stable aqueous aldehyde resin dispersions and for the production of surface coating binders.

For this purpose, a melt or highly concentrated solution of a polycondensate of urea and a CH-acidic aldehyde, with or without formaldehyde, is dispersed in water in the presence of an organic protective colloid and, if required, an emulsifier.

These aqueous resin dispersions can be used, in combination with other film formers, as surface coating binders.

4 Claims, No Drawings

PREPARATION OF AQUEOUS DISPERSIONS OF CONDENSATES OF UREA AND CH-ACIDIC ALDEHYDES, AND PRODUCTION OF SURFACE COATING BINDERS

The present invention relates to a process for the preparation of stable aqueous dispersions of condensates of urea and CH-acidic aldehydes, and the production of surface coating binders by combining these dispersions with various film formers, such as aqueous solutions and/or dispersions of alkyd resins and/or polymers of α,β-ethylenically unsaturated compounds.

Condensates of urea and CH-acidic aldehydes, with or without formaldehyde, have long been known and are described in, for example, European Patent Nos. 2,793 and 2,794.

These condensates, which are hard resins, are prepared in general by acid-catalyzed condensation of urea and CH-acidic aldehydes, if desired in combination with formaldehyde (aldehyde resins).

Aldehyde resins in combination with high molecular weight film formers, e.g. cellulose derivatives, chlorinated rubber, copolymers based on vinyl esters, vinyl ethers, vinyl chloride, vinylaromatics or acrylates, chemically drying binders, e.g. alkyd resins, and drying and semi-drying oils, can be used for the preparation of surface coatings.

The resins are usually processed together with the solvents and diluents conventionally used in the surface coatings industry, e.g. alcohols, ketones, esters and aliphatic and aromatic hydrocarbons, such as mineral spirit, hexane, toluene or xylene, and other assistants.

It is an object of the present invention to make hard resins suitable for use in other fields and at the same time to permit these resins to be processed with less environmental pollution. Moreover, it is intended to improve the resistance to yellowing when exposed to light and heat and to improve the covering power and hardness of the surface coating films.

We have found that this object is achieved, and that stable aqueous secondary dispersions of finely divided, water-insoluble aldehyde resins can be prepared, if a melt or highly concentrated solution of the aldehyde resin is dispersed in water in the presence of a protective colloid, with or without the addition of an emulsifier.

The present invention relates to a process for the preparation of a stable aqueous dispersion of a condensate of urea and a CH-acidic aldehyde, with or without formaldehyde, wherein a melt or highly concentrated solution of this condensate is dispersed in water in the presence of an organic protective colloid, with or without the addition of an emulsifier.

According to the invention, preferably used organic protective colloids are copolymers df vinyllactams and vinyl esters or carboxyl-containing (meth)acrylate copolymers, some or all of whose carboxyl groups are neutralized.

The present invention furthermore relates to a process for the production of surface coating binders by combining the aqueous hard resin dispersions, prepared according to the invention, with other film formers, in particular in combination with aqueous solutions and/or dispersions of alkyd resins and/or polymers of α,β-ethylenically unsaturated compounds.

Regarding the novel process and the components suitable for this purpose, the following may be stated specifically:

Suitable aldehyde resins for the novel process are the abovementioned condensates of urea and CH-acidic aldehydes, such as isobutyraldehyde, n-butyraldehyde, 2-methylpentanal, 2-ethylhexanal and/or 2-phenylpropanal, if desired in combination with formaldehyde. These resins can be obtained, for example by the method described in European Patent Nos. 2,793 or 2,794, from urea or substituted ureas and CH-acidic aldehydes, such as isobutyraldehyde, if desired in combination with formaldehyde, by acid-catalyzed condensation. The said resins generally have a softening point (according to DIN No. 53,180) of from 60° to 140° C., preferably from 70° to 100° C. Such condensates and their preparation are described in, for example, the above European patents.

Preferred condensates (also referred to as aldehyde resins or hard resins) are those which contain urea and a CH-acidic aldehyde as condensed units in a molar ratio of from 1:4 to 1:10; as much as 50 mol percent of the CH-acidic aldehyde can be replaced with formaldehyde.

According to the invention, the aldehyde resins, in molten form or in the form of their highly concentrated, about 75-95% strength, solutions, are dispersed in water which contains the organic protective colloid and, if required, also contains an emulsifier.

Suitable solvents for the resin solutions are alkanols of 1 to 12 carbon atoms, such as ethanol, isopropanol, butanols, e.g. n-butanol and/or isobutanol, or 2-ethylhexanol, and mixtures of the stated alcohols. Glycol monoalkyl ethers, e.g. ethyl ethylene glycol and/or butyl ethylene glycol, diethylene glycol alkyl ether and dipropylene glycol alkyl ethers and mixtures of these, aromatics, such as toluene and xylene, and mineral spirit are also useful.

Suitable organic protective colloids are copolymers of vinyllactams and vinyl esters, and polymer dispersions based on acrylates/(meth)acrylic acid.

Copolymers of vinyl esters of carboxylic acids of 1 to 4 carbon atoms, e.g. vinyl formate, vinyl acetate, vinyl propionate or vinyl butyrate, with N-vinylamides, such as vinylpyrrolidone or vinylcaprolactam, are particularly suitable. Copolymers of vinylpyrrolidone with vinyl acetate and/or vinyl propionate, in particular those which contain vinylpyrrolidone and vinyl esters as copolymerized units in a molar ratio of from 1:1.2 to 1:0.2, e.g. copolymers of about 66 parts of N-vinylpyrrolidone and about 34 parts of vinyl propionate, having a K value (according to DIN No. 51,562, 0.5% strength in $H_2O$) of from 40 to 45 (e.g. solutions of 30% strength in water), are preferred.

Other suitable organic protective colloids are copolymers of olefinically unsaturated monomers containing hydrophilic groups, such as hydroxyl, carboxyl, amide and/or amino groups, and other copolymerizable olefinically unsaturated organic compounds, such as esters of acrylic acid or methacrylic acid with alcohols of 1 to 12, preferably 1 to 4, carbon atoms, e.g. ethyl (meth)acrylate, propyl (meth)acrylate, butanediol diacrylate, hexanediol diacrylate or diethylaminoethyl acrylate, vinyl esters of carboxylic acids of 1 to 12, preferably 2 to 4, carbon atoms, e.g. vinyl acetate and/or vinyl propionate, vinyl ethers with alcohols of 1 to 12, preferably 2 to 4, carbon atoms, e.g. vinyl ethyl ether or vinyl isobutyl ether, vinylaromatics, such as styrene and/or vinyltoluene, and vinylcyclohexene, as well as mixtures of these monomers.

The olefinically unsaturated monomers containing hydrophilic groups, such as hydroxyl, carboxyl, amide and/or amino groups, are present in the copolymers, as copolymerized units, in amounts such that the copolymers are water-soluble or at least uniformly water-swellable, in the case of carboxyl-containing copolymers this being so after partial or complete neutralization with an alkali, ammonia or an organic amine.

Examples of suitable hydroxyl-containing copolymerizable olefinically unsaturated monomers are hydroxyalkyl acrylates or hydroxyalkyl methacrylates where alkyl is of 2 to 12 carbon atoms, e.g. hydroxyethyl (meth)acrylate, hydroxypropyl acrylate, hydroxybutyl acrylate or mixtures of these.

Examples of suitable carboxyl-containing copolymerizable olefinically unsaturated monomers are olefinically unsaturated mono- and dicarboxylic acids, such as acrylic acid, methacrylic acid, crotonic acid, maleic acid, maleic half esters of monoalkanols of 1 to 4 carbon atoms, itaconic acid, itaconic half esters and mixtures of these, acrylic acid and methacrylic acid being preferred.

Examples of suitable amide-containing copolymerizable olefinically unsaturated monomers are acrylamide, methacrylamide and their derivatives, e.g. N-alkyl(meth)acrylamide and N-alkoxymethyl(meth)acrylamide, where alkyl and alkoxy are of 1 to 4 carbon atoms, and/or N-hydroxymethyl(meth)acrylamide.

The organic protective colloids used according to the invention generally have a K value (according to DIN No. 51,562) in aqueous solutions of from 10 to 100, preferably from 20 to 50.

Preferred organic protective colloids of the last-mentioned group are partially or completely neutralized carboxyl-containing copolymers, in particular copolymers of acrylates or methacrylates (some of which may be replaced by styrene) with $\alpha,\beta$-olefinically unsaturated carboxylic acids of 3 to 5 carbon atoms, such as acrylic acid, methacrylic acid, maleic acid or itaconic acid, the carboxylic acid being present as copolymerized units in general in amounts of from 10 to 60, in particular from 25 to 40, percent by weight, based on the total weight of the copolymer. Examples of preferred copolymers of this type are copolymers of ethyl acrylate and acrylic acid and/or methacrylic acid, which, as a 25% strength aqueous dispersion, have a pH of about 2 before neutralization.

Particularly suitable emulsifiers, which may or may not be present, are non-ionic emulsifiers, some of which, i.e. not more than 50 percent by weight, may be replaced with ionic emulsifiers, such as paraffin(olefin)-sulfonates or sulfated, oxyethylated alkylphenols, in which alkyl is of 8 or 9 carbon atoms and which contain from 5 to 40 ethylene oxide units, or fatty acid triethanolamine esters.

Examples of suitable non-ionic emulsifiers are ethylene oxide or propylene oxide adducts of fatty alcohols, e.g. of tallow fatty alcohol or $C_{12}$–$C_{14}$-fatty alcohols. Ethylene oxide adducts of this type which contain from 5 to 50, preferably from 8 to 25, ethylene oxide units per fatty alcohol molecule are preferred.

Examples of other non-ionic emulsifiers which can be used concomitantly are ethylene oxide adducts of alkylphenols where alkyl is of 4 to 18 carbon atoms, oxyethylated fatty acids (stearic acid or oleic acid) containing from 5 to 20 ethylene oxide units, and castor oil containing from 5 to 40 ethylene oxide units. Other suitable emulsifiers are partially hydrolyzed polyvinyl acetates and polyvinyl alcohols, water-soluble cellulose derivatives and polyvinylpyrrolidones having a K value of from 25 to 100 (e.g. Luviskol ® K) and hydrolyzed vinyl acetate/vinylpyrrolidone copolymers containing 50 mol % of pyrrolidone having a K value of from 20 to 40.

To carry out the process according to the invention, the aldehyde resin, as a melt or as a highly concentrated solution, is mixed with the water which contains the protective colloid and, if required, also contains an added emulsifier. This procedure can be carried out at from 40° to 100° C. while stirring or supplying energy for agitation by some other means, for example by dispersing with an Ultra-Turrax or circulating via nozzles.

The organic protective colloid is added to the water serving as the dispersing medium, in general in an amount of from 0.1 to 20, preferably from 1 to 5,% by weight, based on the solid resin.

From 0 to 20, preferably from 0.1 to 5,% by weight, based on the solid resin, of emulsifiers can be added. The novel process can be carried out in a conventional mixing unit, for example in a stirred vessel.

The process according to the invention gives stable aqueous, finely divided (mean particle diameter about 0.1–10 μm) dispersions which have a solids content of from 30 to 70% by weight, possess a long shelf life and can very advantageously be processed together with other aqueous film-forming surface coating binders, for example aqueous alkyd resin solutions or aqueous polymer dispersions.

Suitable aqueous alkyd resin solutions or dispersions are the products conventionally used in industry. It is possible to use, for example, water-dilutable short-oil, oil, medium-oil or long-oil alkyd resins, for example those based on dehydrated castor oil, which are neutralized with triethanolamine and are present as a 55% strength aqueous solution, and middle-oil alkyd resins based on drying fatty acids which are modified with isocyanates.

Examples of suitable aqueous polymer dispersions are primary dispersions of copolymers of styrene/butadiene, styrene/$C_1$–$C_{12}$-alkyl (meth)acrylates, $C_1$–$C_{12}$-alkyl (meth)acrylates, vinyl esters, such as vinyl acetate and vinyl propionate, and vinyl esters/(meth)acrylates. These copolymers can contain further monomers possessing OH, COOH or $CONH_2$ groups, the last mentioned being present as copolymerized units in general in minor amounts of from 1 to 10, preferably from 2 to 5,% by weight. Such primary dispersions are described in, for example, Houben-Weyl, Methoden der Organischen Chemie, volume 14/1 (1961), page 186 et seq., and generally have a solids content of about 30–65, preferably from 45 to 55,% by weight.

Depending on the properties which the surface coating is required to possess, the aldehyde resin dispersions prepared according to the invention can be combined with the alkyd resin solutions or polymer dispersions in amounts of from 2 to 50, preferably from 5 to 20,% by weight, based on solids, and, if necessary after the addition of pigments, fillers, dyes, leveling agents (e.g. those based on silicone oil), curing catalysts (such as Co octoate, Pb octoate, Mn octoate, Co naphthenate, Pb naphthenate and/or Mn naphthenate, e.g. ®Soligen, Co, Pb, Mn) and other assistants, which can be added in amounts conventionally used for these additives, are applied onto the substrates to be coated, using a conventional method, e.g. brushing on, immersion, spraying, casting, or roller-coating with a steel or rubber roller or with a roller covered with a soft absorbent material, and are dried, or baked by heating at from 80° to 150° C. Substrates which can be coated are metals, paper, wood-working materials, plastics and mineral substrates.

The surface coatings produced in this manner possess increased fullness, hardness and gloss and possess excellent resistance to yellowing when exposed to light and heat.

In the Examples below, parts and percentages are by weight, unless stated otherwise.

EXAMPLE 1

In a stirred apparatus equipped with a thermometer, a dropping funnel and an apparatus for distillation under reduced pressure, 500 parts of an aldehyde resin based on a condensate of urea, formaldehyde and isobutyraldehyde and having a softening point of from 80° to 90° C. (DIN No. 53,180) are dissolved in 170 parts of isobutanol. 211 parts of a mixture of 200 parts of a 15% strength aqueous solution of a 2:1 copolymer of N-vinylpyrrolidone and vinyl propionate and 11 parts of a 90% strength oxyethylated $C_{12}$-$C_{14}$-fatty alcohol are introduced into the vigorously stirred resin solution in the course of 60 minutes at from 40° to 50° C. When the addition of the protective colloid/emulsifier mixture is complete, stirring is continued for 20 minutes, after which 600 parts of water are added dropwise in the course of 2 hours at from 45° to 48° C. During the dropwise addition of water, isobutanol/water is distilled off simultaneously as an azeotrope under reduced pressure (110 mbar).

When 470 parts of the isobutanol/water mixture have been distilled off, the stirred mixture is cooled to room temperature. 1,010 parts of an aqueous resin disperson having a solids content of 53% and a long shelf life are obtained.

EXAMPLE 2

In a stirred apparatus as described in Example 1, 500 parts of the aldehyde resin stated in Example 1 (softening point=80°-90° C. according to DIN No. 53,180) are dissolved in 60 parts of isobutanol at from 70° to 80° C. A mixture of 200 parts of a 15% strength solution of the 2:1 N-vinylpyrrolidone/vinyl propionate copolymer and 50 parts of a 20% strength aqueous solution of a highly oxyethylated tallow fatty alcohol is then introduced in the course of 60 minutes into the vigorously stirred resin solution, which is at about 70° C. When the addition of the protective colloid/emulsifier mixture is complete, stirring is continued for 20 minutes after which 300 parts of water are added dropwise in the course of 90 minutes at from 45° to 50° C. During the dropwise addition of the water, isobutanol/water is simultaneously distilled off as an azeotrope under reduced pressure (about 110 mbar). When about 200 parts of isooutanol/water mixture have been distilled off, the stirred mixture is cooled to room temperature.

900 parts of a 59% strength aqueous resin dispersion are obtained, this dispersion being brought to a solids content of 55% by adding water.

EXAMPLE 3

In a stirred appara us equipped with a reflux condenser, a thermometer, a dropping funnel and a highly effective stirrer, 1,000 parts of the aldehyde resin stated in Example 1 (softening point 80°-90° C. according to DIN No. 53,180) are dissolved in 70 parts of isobutanol at from 80° to 85° C. 500 parts of a mixture of 400 parts of a 15% strength aqueous solution of the N-vinylpyrrolidone/vinyl propionate copolymer already mentioned in Examples 1 and 2 and 100 parts of a 20% strength aqueous solution of a highly oxyethylated tallow fatty alcohol are then added dropwise at from 70° to 75° C. When the dropwise addition of the protective colloid/emulsifier solution is complete, stirring is continued for 20 minutes, after which 400 parts of water are introduced in the course of one hour at from 60° to 62° C.

1,960 parts of a stable resin dispersion having a solids content of 55% are obtained.

EXAMPLE 4

500 parts of an aldehyde resin based on urea, formaldehyde and isobutyraldehyde (softening point 80°-85° C. according to DIN No. 53,180) are dissolved in 50 parts of butylglycol at 80° C., while stirring. The resin solution is cooled to 70° C., after which a solution of 200 parts of a 15% strength aqueous solution of the above N-vinylpyrrolidone/vinyl propionate copolymer, 50 parts of a 20% strength aqueous solution of the highly oxyethylated tallow fatty alcohol stated in Example 3 and 230 parts of water are introduced in the course of 90 minutes, the temperature being maintained at 70° C. Stirring is continued for 30 minutes at from 60° to 70° C., and the mixture is then cooled to room temperature.

1,030 parts of a stable dispersion having a solids content of 52.5% are obtained.

EXAMPLE 5

In a stirred apparatus as described in Example 3, 1,500 parts of the aldehyde resin stated in Example 1 and having a softening point of from 80° to 90° C. (DIN No. 53,180) are dissolved in 105 parts of isobutanol at 90° C. A solution which has been neutralized with 8 parts of 25% strength ammonia solution and consists of 120 parts of a 25% strength polymer dispersion based on acrylate/methacrylic acid, which has a pH of 2 before neutralization, in 1,350 parts of water is then introduced in the course of 3 hours at from 85° to 90° C. The mixture is stirred for a further hour at 60° C. and then cooled to room temperature, and 3,070 parts of a stable dispersion having a solids content of 50% are obtained.

EXAMPLE 6

A mixture of 45 parts of a 55% strength aqueous alkyd resin solution containing an alkyd resin based on dehydrated castor oil (acid number=30.5) and 6 parts of triethanolamine is added dropwise, at 70° C., to a vigorously stirred, concentrated resin solution prepared by dissolving 250 parts of the aldehyde resin stated in Example 1 (softening point 80°-90° C. according to DIN No. 53,180) in 20 parts of isobutanol. 200 parts of water are then introduced in the course of 2 hours at from 60° to 70° C., after which the stirred mixture is cooled to room temperature.

520 parts of a stable resin dispersion having a solids content of 52.5% are obtained.

EXAMPLE 7

500 parts of an aldehyde resin based on urea and isobutyraldehyde and having a softening point of from 70° to 75° C. (DIN No. 53,180) are melted, at about 95°-100° C., in a stirred flask equipped with a condenser, a thermometer and a dropping funnel. A mixture of 200 parts of a 15% strength aqueous solution of the abovementioned N-vinylpyrrolidone/vinyl propionate copolymer and 50 parts of a 20% strength aqueous solution of a highly oxyethylated tallow fatty alcohol is introduced into the melt in the course of 60 minutes, while stirring vigorously. During the addition of the protective colloid/emulsifier mixture, the temperature is reduced from 95°-100° C. to about 60° C. 300 parts of water are then run in at from 55° to 60° C. in the course of 2 hours, after which the stirred mixture is cooled to room temperature.

1,050 parts of an aqueous resin dispersion having a solids content of 51% are obtained.

EXAMPLE 8

Combination of an aldehyde resin dispersion with various film-forming assistants.

The aldehyde resin dispersion prepared as described in Example 1 forms a film at from 44° to 90° C. Film formation is improved by adding film-forming assistants, such as alkylglycols, e.g. butylglycol, alkylglycol esters, e.g. butylglycol acetate, aromatic hydrocarbons, e.g. xylene, or aliphatic hydrocarbons, e.g. mineral spirit, in amounts of from 5 to 20%. The addition of butylglycol and/or mineral spirit in amounts of from 5 to 20% permits film formation to take place at as low as room temperature. Characteristics of the dispersion:
Solids content: 53%
Efflux time (DIN 4 cup 23° C.): 146 sec.
Minimum film-forming temperature: 44° C.

Table 1 below shows the film-forming properties (minimum film-forming temperatures), the viscosities and the hardness of the dispersion films with various film-forming assistants (ethylglycol acetate, xylene, butylglycol and mineral spirit).

TABLE 2

| | | | | | |
|---|---|---|---|---|---|
| Alkydal R 40 W (55% strength) pH 8.5 | 100 | 90 | 80 | 60 | 40 |
| Aldehyde resin dispersion from Example 1 + butylglycol 9:1 | — | 10 | 20 | 40 | 60 |
| Film hardness (pendulum damping by the Konig method) [sec] | | | | | |
| (a) without a siccative* | 10 | 18 | 30 | 113 | 182 |
| (b) with a siccative* | 28 | 38 | 82 | 184 | 194 |

*Siccative = mixture of Co, Pb and Mn octoates and naphthenates

EXAMPLE 10

Combination of the aldehyde resin dispersion with a water-dilutable, isocyanate-modified, middle-oil alkyd resin based on drying fatty acids (e.g. ®Alkydal F50W, having an oil content as triglyceride of Ca 49% and a phthalic anhydride content of Ca 19%) for the production of an air-drying or oven-drying industrial surface coating:

10% and 20% of the aldehyde resin dispersion prepared as described in Example 1 are added to an alkyd resin neutralized with ammonia, a predispersed pigmented mixture (mixture I) being combined with a predetermined siccative-containing mixture (mixture II) in each case. The effect on the film hardness, yellowing and gloss is investigated, and the results are summarized in Table 3.

TABLE 3

| Mixture I: | | | |
|---|---|---|---|
| Alkydal F 50 W (55% strength in butylglycol) pH 9.5 | 71.8 | 64.2 | 57.1 |
| Aldehyde resin dispersion from Example 1 | — | 7.4 | 14.7 |
| Byk 301** | 0.4 | 0.4 | 0.4 |
| Titanium dioxide (rutile) | 94.5 | 94.5 | 94.5 |
| water | 84 | 84 | 84 |
| Mixture II: | | | |
| Alkydal F 50 W (55% strength in butylglycol) pH 9.5 | 100.5 | 90.5 | 80.5 |
| Aldehyde resin dispersion from Example 1 | — | 10.4 | 20.8 |
| ® Soligen Co Pb Mn 50% strength* | 1.9 | 1.75 | 1.5 |
| Water | 126 | 126 | 126 |
| Film hardness: (pendulum damping by the Konig method [sec]) | | | |
| (a) drying for 1 hour at 50° C. + 2 days at room temperature | 60 | 66 | 71 |
| (b) drying for 45 minutes at 120° C. + 2 days at room temperature | 81 | 86 | 89 |
| Yellowing (grading from 0 to 6): | | | |
| (a) drying for 1 hour at 50° C. + 2 days at room temparature | 1 | 0-1 | 0-1 |
| (b) drying for 45 minutes at 120° C. 2 days at room | 3 | 2 | 1-2 |

TABLE 1

| Number of parts of dispersion/number of parts of film-forming assistant | | Film formation at | | | Efflux time, DIN 4 cup, 23° C. | Hardness of the film (pendulum damping by the Konig method) [sec] | Minimum film-forming temperature (°C.) |
|---|---|---|---|---|---|---|---|
| | | Room tempertaure | 50° C. | 120° C. | | | |
| Ethylglycol acetate | 9:1 | 0 | + | + | 125 | 104 | 16 |
| | 8:2 | + | + | + | 140 | 62 | <13 |
| Xylene | 9:1 | 0 | + | + | 225 | 47 | 18 |
| | 8:2 | 0 | + | + | 340 | 40 | <13 |
| Butylglycol | 9:1 | + | + | + | 110 | 42 | <13 |
| | 8:2 | + | + | + | 142 | 36 | <11 |
| Mineral spirit | 9:1 | + | + | + | 228 | 32 | <13 |
| | 8:2 | + | + | + | 340 | 28 | <13 |

EXAMPLE 9

Combination of the aldehyde resin dispersion with a water-dilutable alkyd resin based on dehydrated castor oil (e.g. ®Alkydal R40W, having an oil content as triglyceride of Ca 40% and a phthalic anhydride content of Ca 29%).

100 parts by weight of the resin dissolved in a glycol ether/water mixture to give a 55% strength solution are converted to the water-dilutable form with 2.5 parts by weight of dimethylethanolamine. This water-dilutable alkyd resin is combined with the aldehyde resin dispersion which is prepared as described in Example 1, and to which 10% of butylglycol is added as a film-forming assistant. Each of these aqueous mixtures, which are shown in Table 2, are applied in a 200 μm thick (wet) layer on glass, using a knife coater. Drying is carried out for one hour at 150° C. The effect on the film hardness of increasing amounts of aldehyde resin dispersion in systems with and without a siccative is investigated. The results are summarized in Table 2.

TABLE 3-continued

| | | | |
|---|---|---|---|
| temperature | | | |
| Gloss (multigloss 60° [%]): | | | |
| (a) drying for 1 hour at 50° C. + 2 days at room temperature | 89 | 90 | 94 |
| (b) drying for 45 minutes at 120° C. + 2 days at room temperature | 89 | 92 | 95 |
| Water resistance after 3 hours at room temperature | satisfactory | satisfactory | satisfactory |

*siccative (a curing catalyst which consists of cobalt naphthenate, lead naphthenate and magnesium naphthenate, and having a Co content of 0.75% by weight; a Pb content of 11.0% by weight and an Mn content of 0.75% by weight.
**a non-ionic leveling agent (Mallinckrodt, Wesel)

EXAMPLE 11

Combination of the aldehyde resin dispersion with a styrene/acrylate copolymer primary dispersion as a binder for an interior paint:

In a washable matt interior paint (cf. Table 4), 20% of the styrene/acrylate copolymer dispersion is replaced with the aldehyde resin dispersion prepared as described in Example 1. The effect on the mar-resistance, processability and the yellowing is investigated.

TABLE 4

| | | |
|---|---|---|
| Water | 7.9 | 7.9 |
| Sodium polyphosphate, 10% strength | 2.5 | 2.5 |
| Pigment dispersant A* | 0.2 | 0.2 |
| Ammonia, concentrated | 0.2 | 0.2 |
| Preservative (chloroacetamide) | 0.5 | 0.5 |
| Methylcellulose hv., 2% strength | 20.0 | 20.0 |
| Highly oxyethylated tallow fatty alcohol, 20% strength | 0.5 | 0.5 |
| Mineral spirit | 1.2 | 1.2 |
| Texanol** | 0.8 | 0.8 |
| Titanium dioxide (rutile) | 6.0 | 6.0 |
| Calcium carbonate, precipitated (amorphous) | 15.0 | 15.0 |
| Mineral CaCO$_3$ (mean particle size 4–6 μm) | 15.0 | 15.0 |
| Micro-talc | 5.0 | 5.0 |
| Mineral CaCO$_3$ (mean particle size 4.5 μm) | 15.0 | 15.0 |
| Antifoam (based on silicone oil) | 0.2 | 0.2 |
| Styrene/acrylate copolymer dispersion, 50% strength (particle size about 0.1 μm) | 10.0 | 8.0 |
| Aldehyde resin dispersion according to Example 1 | — | 2.0 |
| Number of scouring cycles | 1250 | 1200 |
| Processing | satisfactory | satisfactory |
| Yellowing | 0–1 | 0 |

*carboxyl-containing copolymer with NH$_3$, adjusted to pH 9
**3-Hydroxy-2,4,4-trimethylpentyl isobutyrate

We claim:

1. A process for the preparation of a stable aqueous dispersion of a water-insoluble condensate of urea and an aldehyde which carries a hydrogen on the carbon adjacent to the carbonyl group, with or without formaldehyde, wherein a melt or an about 75 to 95% strength solution of this condensate is dispersed in water in the presence of at least one reganic protective colloid selected from the group consisting of a copolymer of a vinyllactam and a vinylester, and a carboxyl-containing (meth)acrylate copolymer, some or all of whose carboxyl group are neutralized, with or without the addition of a non-ionic emulsifier, and wherein the molar ratio of urea to aldehyde in the said condensate is from 1:4 to 1:10, it being possible for up to 50 mol percent of the aldehyde to be replaced by formaldehyde.

2. A process as set forth in claim 1, wherein the non-ionic emulsifier used is an oxyethylated fatty alcohol.

3. A process for the production of a surface coating binder, wherein an aqueous resin dispersion prepared by a process as set forth in claim 1, is combined with aqueous alkyd resin solutions or aqueous polymer dispersions, said aqueous polymer dispersions being primary dispersions of copolymers of styrene/butadiene, styrene/C$_1$–C$_{12}$-alkyl (meth)acrylates, C$_1$–C$_{12}$-alkyl (meth)acrylates, and vinyl esters.

4. The process of claim 3 wherein said aqueous polymer dispersion is a vinyl ester/(meth) acrylate copolymer.

* * * * *